Sept. 3, 1963  D. R. BIEGEL ETAL  3,102,552
FLUID FLOW CONTROL AND METERING DEVICE
Filed Dec. 2, 1960  2 Sheets-Sheet 1

DONALD R. BIEGEL
JOHN W. WILLIS
INVENTORS.

BY *Miketta and Glenny*

ATTORNEYS.

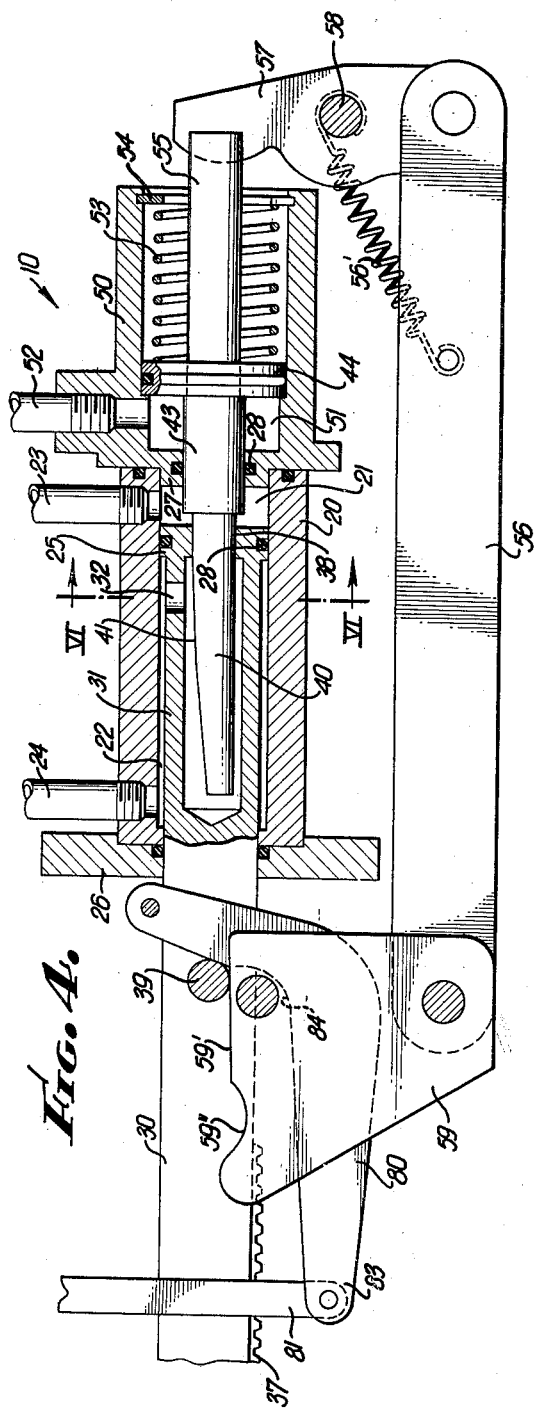
Sept. 3, 1963     D. R. BIEGEL ETAL     3,102,552
FLUID FLOW CONTROL AND METERING DEVICE
Filed Dec. 2, 1960     2 Sheets-Sheet 2
DONALD R. BIEGEL
JOHN W. WILLIS
INVENTORS.
BY Miketta and Glenny
ATTORNEYS.

United States Patent Office 3,102,552
Patented Sept. 3, 1963

3,102,552
FLUID FLOW CONTROL AND METERING
DEVICE
Donald R. Biegel, North Hollywood, and John W. Willis, Granada Hills, Calif., assignors to Datanamics, Inc., Canoga Park, Calif., a corporation of California
Filed Dec. 2, 1960, Ser. No. 73,303
27 Claims. (Cl. 137—494)

This invention relates generally to a metering device for regulating the rate of flow, and volume, of fluid. More particularly, the invention relates to a fluid flow control device which automatically maintains a predetermined rate of fluid flow under conditions of changing back pressure in a line or chamber into which the device is metering fluid.

In various uses of fluids, such as oxygen in hospitals, a central source or supply of fluid may be maintained from which various locations of use are supplied. Oxygen, in hospitals for instance, may be stored in high pressure tanks at a central location, and the various locations of use, i.e. patient rooms, recovery rooms, surgery rooms etc., may be supplied as desired through a system of supply lines. It has been found, however, that in such a system, the amount of oxygen used at any one location is not readily determinable, since only the total supplied from the central tank is normally known. Information as to actual oxygen use at any individual location is necessary to properly allocate the cost of such oxygen among the various users.

In addition, the actual flow rate at each location of use may be very critical, requiring extremely accurate determination of the rate at which oxygen is being delivered, such as when oxygen is supplied through a nebulizer, atomizing liquids for inhaling with the oxygen supply. Furthermore, it has also been found, that when changing conditions of back pressure in a supply line are encountered, as when various orifices are interchangeably employed or a nebulizer is inserted in the line, a predetermined flow rate is reduced due to the increase in back pressure and the desired oxygen supply rate is reduced.

It is therefore an object of this invention to provide and disclose a fluid flow control device which very accurately meters a supply of fluid from a relatively high pressure fluid supply source into a supply line to a station of use.

It is another object of this invention to provide and disclose a fluid flow control device which may be adjusted to provide a predetermined rate of fluid flow and which is adapted to maintain a given rate of fluid flow in a supply line into which the control device is metering fluid under conditions of changing back pressure relative to normal line back pressure.

It is a further object of this invention to provide and disclose a single apparatus which very accurately meters the rate of fluid flow in a supply line, indicates the rate of fluid flow and totalizes the volume of fluid passing therethrough.

It is a still further object of this invention to disclose and provide a compact, portable, easily manufactured fluid flow control device which may be employed at a location or station of use of a fluid supply from a remote source under relatively high pressure to accurately regulate and indicate the rate of fluid flow and totalize the amount of fluid used at such location.

Generally stated, the fluid flow control and metering device, according to the invention comprises: a valve housing having portions thereof acting as fluid supply and fluid dispensing chambers on either side of a movable valve means. Such means include a hollow tubular metering gland positioned within the housing for adjustable axial movement therein. One end of the gland is open to the fluid supply chamber to receive fluid therein, the gland being also vented to the fluid dispensing chamber such that fluid may flow from one chamber to the other through the gland. An axially movable metering plug extends into and cooperates with the open end of the hollow gland to form a valve of variable aperture, it depending upon the relative axial positioning of the gland and plug relative to each other. The rate of flow of fluid from the fluid supply chamber to the fluid dispensing chamber is therefore determined by the relative positioning of the individually movable gland and plug which together form a fluid passageway therebetween of adjustable size. The two chambers may be divided by a stationary ported partition through which the gland slides or preferably may be divided by a portion of the gland itself, the actual dimensions of the two chambers thereby varying with the movement of the gland axially within the valve housing.

The rate of flow of fluid through the valve formed between the gland and plug depends upon the size of the opening therebetween and the pressure difference between the fluid supply and fluid dispensing chambers. The pressure in the fluid supply chamber approximates that of the high pressure fluid source, so the rate of fluid flow through the valve is dependent on the fluid pressure in the fluid dispensing chamber and the relative setting of the gland and plug. The gland is initially set manually relative to the valve housing, and the initial rest position of the plug. A rate of flow is established of known value for the valve aperture setting and the normal line back pressure encountered, due to friction and line orifices. If abnormally high line back pressure conditions develop, the pressure in the dispensing chamber increases, reducing the pressure differential between the two chambers such that the rate of flow decreases. The axially movable plug is provided with means responsive to back pressure conditions in the fluid dispensing chambers such that the plug will respond by moving away from the gland and thereby opening the aperture wider when the back pressure increases. The original rate of flow may be maintained thereby even with the reduction in the pressure differential between the supply and dispensing chambers because of the widening of the valve aperture of fluid passageway.

When known increased back pressure conditions are expected, mechanical reference means may be employed to limit the range of plug response to line back pressure and to restrict the range of gland adjustment so that very accurate constant flow rate conditions may be maintained as indicated by the device according to the setting of the gland.

The rate of fluid flow through the device may be calibrated on scale means associated with the manually adjustable gland for various selected positions of the gland. In addition, the volume of fluid flow may be determined by the provision of integrator or totalizer means associated with the gland. Such means may be so provided to translate the positioning of the gland, which determines flow rate, into a volume of flow summation.

Various additional objects and advantages as well as a further understanding of our invention will be facilitated by the following detailed description of an exemplary embodiment of a device, according to our invention, in which reference will be made to the following drawings:

FIG. 3 is a transverse sectional view of the device of FIGS. 1 and 2 taken along the plane III—III;

FIG. 4 is a horizontal partially sectional view of a portion of the device of FIG. 2;

FIG. 5 is a detail view of a modified form of a portion of the device of FIG. 4.

Figures 1, 2, 6:
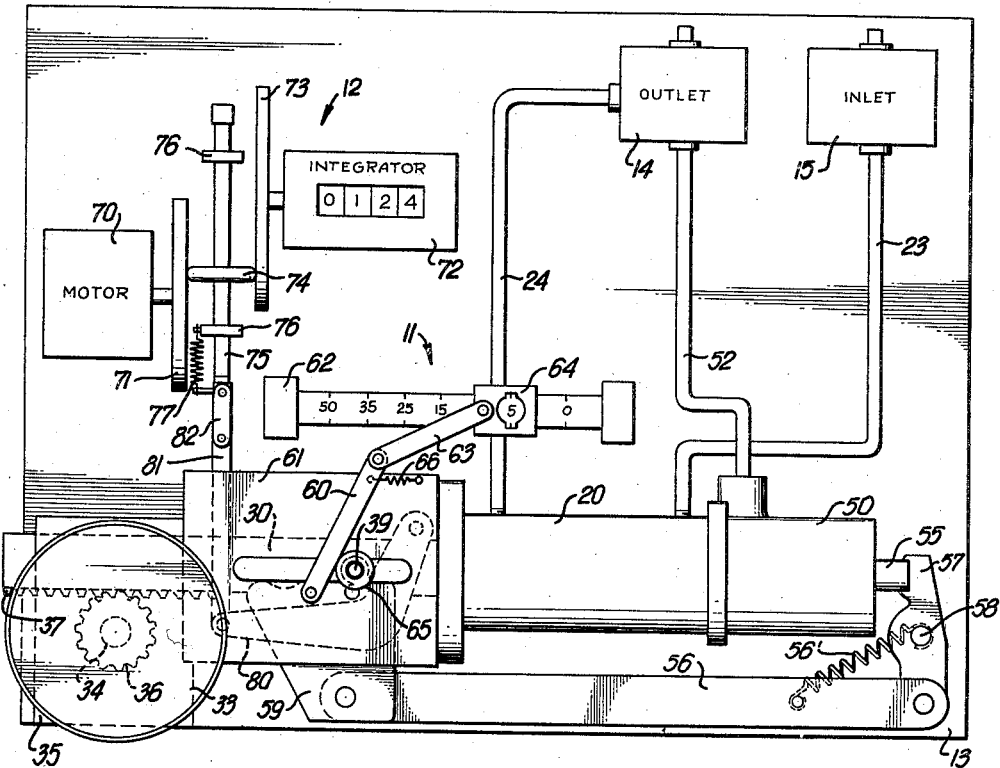
FIG. 1 is a plan view of a fluid flow metering device according to the invention.
FIG. 2 is a front elevational view of the device of FIG. 1.
FIG. 6 is a detail cross sectional view of a portion of the device of FIG. 4 taken along the plane VI—VI.

Referring first to FIGS. 1, 2 and 3, the fluid flow control and metering device, according to our invention, may be made in a compact portable assembly, as shown, wherein a fluid flow control valve, indicated generally at 10; a flow rate indicator means, indicated generally at 11; and an integrator or totalizer means, indicated generally at 12, are provided on a base plate 13. An inlet 15 and an outlet 14 are provided to facilitate ease of connection of the device into a supply line from a fluid source at a location of use to regulate the rate of fluid flow, indicate the rate and totalize the volume of fluid consumed at any given location of use.

Referring now to FIG. 4 particularly, the fluid flow control valve is shown in cross-section and comprises a valve body or housing 20, having a fluid supply chamber 21 and a fluid dispensing chamber 22. Supply chamber 21 is connected by fluid line 23 to inlet 15 while dispensing chamber 22 is connected by line 24 to outlet 14. The two chambers 21 and 22 may have end plates 27 and 26 respectively, to close the ends and may be separated by a partition 25 mounted on the gland 30. A stationary ported partition through which the gland would slide could also be provided, though the partition 25, as shown, is preferred.

Manually adjustable valve means are provided for controllably regulating the flow of fluid from the supply chamber 21 into the dispensing chamber 22. Said valve means comprises a tubular gland 30, having a hollow portion 31, and a metering plug 40 which extends into and cooperates with the gland 30.

Hollow tubular metering gland 30 is positioned within the housing 20 through end plate 26 with partition 25 thereon to be movable in the direction of its axis. End plate 26 and partition 25 are provided with sealing O-rings 28 to prevent leakage of fluid about the outside of gland 30 either from chamber 21 into chamber 22 or from chamber 22 to the atmosphere. Hollow portion 31 is open at the end of gland 30 within the chamber 21 to receive fluid therefrom and is vented, by vents 32, to the dispensing chamber 22 at a portion rearward of partition 25 to pass fluid into said chamber 22. Gland 30 is manually adjustable relative to the housing 20 by means of the hand knob 33. Knob 33 is mounted on an axis 34 journaled in a housing 35. A pinion 36 is provided on axis 34 to act upon a rack gear 37 on a portion of gland 30, as shown in FIG. 2, so that as knob 33 is manually adjusted, gland 30 is moved axially within the housing 20.

Metering plug 40 enters gland 30 at the open end in the fluid supply chamber 21, as shown in FIG. 4, and is axially movable within the housing 20 relative to gland 30 through the end plate 27. Gland 30 and plug 40 are preferably provided with their axes accurately aligned to allow relative movement without binding effects or undue frictional interference. Such alignment is particularly important when the gland is provided with a rounded metering surface 38, ground to an accurately round surface, and plug 40 is provided in the form of a cylindrical pin as best seen in FIG. 4.

Metering pin or plug 40 may be provided as a cylindrical pin having an inclined flat 41 of varying width on its surface, the plug and gland forming a fluid passageway between the flat 41 and metering surface 38 of gland 30. The passageway thus formed, as shown in FIG. 6, is a semi-circular segment of adjustable size which meters the fluid passing from chamber 21 into chamber 22. Flat 41 may be provided in two portions having taper of different degree, axial movement of plug 40 relative to the metering surface 38 of gland 30 producing a small change in the size of the passageway where the taper is slight and a larger change where the taper is greater, as shown in FIG. 4. Plug 40 may also be alternatively provided with a stabilizing ring 42 as shown in FIG. 5, to aid in maintaining plug 40 in axial alignment with gland 30, to facilitate their relative movement and maintain the alignment of the metering surface 38 with the outer surface of plug 40. A plug such as employed in a needle valve may be also used here but we have found that the use of the above described cylindrical pin, with an inclined flat, allows much greater accuracy in regulating flow of fluid through the valve and is therefore preferably employed in our device.

Means responsive to pressure variations in the dispensing chamber are provided in association with the metering plug 40 to make said plug responsive to conditions of increased back pressure occurring in chamber 22 or line 24. Such means may comprise first a housing member which may be a part of housing 20 or be provided, as shown in FIG. 4, as a separate housing 50 into which and through which a rear portion 43 of metering plug 40 extends. Housing 50 includes a hollow chamber 51 and has a fluid line or passage 52 communicating with the dispensing chamber 22 through the outlet element 14 and fluid line 24. Plug 40 is further provided with a circular flange or piston element 44 closing one end of chamber 51 and is biased by a spring 53 toward the gland 30 and therefore toward a closed position of the valve. Spring 53 is held in the open ended housing 50 by an expanding ring retainer 54 which fits into a recess about the inside of housing 50 near the open end. Metering plug 40 is thereby responsive to pressure variations in the dispensing chamber 22 since, as the pressure rises in chamber 22, the pressure is increased a corresponding amount in chamber 51, urging plug 40 against the bias of spring means 53. The spring means 53 may be so provided that the metering plug 40 will assume various known positions under loading, the spring deflecting known amounts under known loading conditions determined by the pressure in chamber 51 and the surface area of flange 44 subjected to such pressure. Therefore, as gland 30 is moved from a closed position, to the left in FIG. 4, due to manual adjustment of knob 33, the valve opening provided between gland metering surface 38 and plug 40 begins to open and fluid begins to flow from line 23 into chamber 21 through the valve into gland hollow portion 31, through vents 32 into chamber 22, line 24 and outlet element 14 where it may be drawn off to the apparatus being supplied. As the back pressure in line 24 and chamber 22 builds due to resistance to fluid flow through the various fluid lines and the fluid using apparatus, the pressure builds equally in chamber 51 causing spring 53 to deflect slightly. The gland and plug, in effect, move away from each other in opening the valve as the gland 30 is moved manually, the spring means 53 preventing the plug 40 from over reacting or running way and opening the valve to the full extent the plug 40 is axially movable away from the gland. A given rate of flow of fluid through the valve may therefore be determined by the manual adjustment of gland 30, plug 40 reacting in known fashion to assume a position in which it is in equilibrium under the urging of the pressure in chamber 51 and spring means 53. The movement of plug 40 is therefore dependent on the positioning of gland 30 initially and the pressure in dispensing chamber 22. It may therefore be seen, that after the gland 30 has been set and a predetermined flow rate established, if there is an increase in back pressure in line 24 and chamber 22 for any reason, such as obstructions due to smaller-size orifices in apparatus drawing from outlet 14, the plug 40 will react to such increased back pressure by moving to the right in FIG. 4 opening the valve passage between gland 30 and plug 40 wider. Similarly, if there is a reduction in back pressure, the plug 40 will react moving to the left in FIG. 4 reducing the opening of the valve to maintain the established rate of flow. The predetermined rate of fluid flow through the valve may thereby be maintained in spite of the variations in pressure in chamber 22 which would tend to change the rate of flow, it being dependent on the pressure differential between chambers 21 and 22 and the size of the valve opening.

Spring means 53 may be so provided that plug 40 will not undergo deflection allowing rearward movement of plug 40, below a given order of fluid pressure in chambers 22 and 51, such order or amount of pressure being the normal operating pressure expected. Plug 40 is then stationary while gland 30 is moved manually opening the valve until normal operating pressures are reached. Increased back pressure above the normal operating pressure due to various obstructions in the delivery line 24 and lines supplied therefrom is then compensated for by movement of plug 40 rearward, opening the valve wider, the plug responding to the increase of pressure over that amount necessary to cause deflection of spring means 53. A constant rate of flow determined for normal operating pressures may thereby be provided, the device automatically compensating for conditions of increased back pressure over those normally encountered.

Means to restrict the range of rearward movement of plug 40 in response to back pressure increase in the supply lines and in chambers 22 and 51 may be provided to insure accuracy of such response where known conditions of increased back pressure are expected. Such means may comprise a mechanical reference pin 55, which may be integral with plug 40 on rearward end 43, linkage 56 and 57 and cam plate 59. If a known amount of back pressure is expected to occur after a predetermined rate of flow is established, the amount that the plug 40 need be moved, opening the valve wider, to maintain constant rate of flow under such increased pressure is readily determinable. For example, when used to meter and totalize oxygen use in a hospital, the apparatus may provide flow rates of up to 100 liters of oxygen per minute when exhausting into atmospheric pressure, the oxygen supply is at about 50 pounds per square inch and no small orifices, less than about ⅜ inch, are provided in the line. However, when the same apparatus is connected to a nebulizer or humidifier, normally having an orifice of about .025 inch in diameter, only about 15 liters of oxygen per minute will flow through the apparatus under the same 50 pound upstream pressure of the oxygen supply. The accuracy of the flow rate indicator means may be insured by provision of the mechanical reference pin 55 interconnected with the plug 40. Linkage 56 and 57, and cam plate 59 may be provided to limit rearward movement of plug 40, as by contact with integral pin 55 within a range of movement required to compensate for the expected pressure rise, thereby very accurately positioning plug 40 during conditions of increased back pressure. The proper positioning of the movable plug 40 for an expected increase in back pressure over normal operating pressure may be accomplished by connecting the end of plug 40, by way of integral pin 55, to an arm 56, by way of the link or lever arm 57 which is pivotally mounted on a support 58, and then controlling the movement of arm 56 relative to gland 30 by way of a cam plate 59. Arm 56 may be biased by the spring 56'. Cam plate 59 is pivotally connected to both the stationary plate 61 and the movable arm 56 and is adapted to abut against a part 39, integral with gland 30, restricting movement of plug 40, for various positions of gland 30, to the amount necessary to compensate for an expected increase in back pressure. A different cam surface 59' may be provided for each different general condition of increase in back pressure expected, as when a small orifice is expected to be inserted in the line, as in a nebulizer or humidifier normally used in hospitals. A single cam plate, however, once designed for the general conditions of back pressure expected and the normal range of fluid flow desired, allows the exact necessary movement for any setting of gland 30 and flow rate within its range of operation. The range of operation within which a setting of the gland will produce an accurate rate of flow, back pressure changes being compensated for by the means responsive to back pressure moving plug 40, is controlled by the further provision on cam plate 59 of a hook element or portion 59". As stated before, the rate of flow through the valve is determined by the pressure difference between chambers 21 and 22 and the size of the valve opening therebetween. The rate of flow indicated by the setting of gland 30 can be maintained in the face of known increased back pressure conditions only within a certain maximum limit of flow since the plug 40 can only compensate a certain amount and the pressure in chamber 21 is generally a constant approximating the fluid pressure value of the high pressure source. Thus, the device has certain physical limitations in maintaining a constant rate of fluid flow in systems with known back pressure conditions to be compensated for. Hook 59" constrains the gland 30 at a maximum setting wherein the plug 40 has moved its maximum extent in overcoming such expected back pressure conditions. Thereafter gland 30 can not be moved beyond settings for which the device will actually maintain constant fluid flow rates for the characteristics of the particular system and the back pressure conditions expected. Thus, in the foregoing example of the use of a nebulizer or the like where the maximum flow rates for given upstream pressure is about 15 liters per minute, the combined action of hook 59" and reference pin 55 on the placement of gland 30 relative to plug 40 prevents the operator from moving the gland to a setting reflecting greater flow rates than can be actually delivered by the apparatus under the back pressure conditions expected.

Flow rate indicator means, indicated generally at 11 are provided in association with gland 30 to indicate the rate of flow of fluid, as in liters per minute, through the fluid passageway for any given setting of gland 30. As best shown in FIG. 1, such means may comprise a pivotally mounted arm 60, mounted on a plate 61; a scale 62, calibrated in dimensions of rate of flow, and a linking arm 63 to translate movement of the arm 60 to the scale 62. An indicator 64 on the scale 62 is moved along scale 62 in response to positioning of the gland 30 due to the arcuate movement of arm 60 acting on link 63 and indicator 64, as caused by the engagement of part 39 with arm 60 as gland 30 is adjusted. Part 39 extends upwardly of gland 30 through a slot in plate 61 which is axially aligned with gland 30. A roller 65 may be provided on part 39 above plate 61 to rollingly engage the arm 60 while urging it in response to movement of gland 30 to the left in FIG. 1. Arm 60 may be biased by a spring 66 into a position wherein the indicator 64 is aligned with a zero reading on scale 62.

Fluid flow integrator or totalizer means are also provided, as indicated generally at 12, to indicate the total volume of fluid, as in liters, that pass through the device and are consumed. The totalizer means are responsive to the setting of gland 30 in determining the volume of fluid used as hereafter described.

A constant speed motor 70 is provided to drive a friction disk 71 at a constant angular velocity. A revolution counter 72, calibrated in liters per revolution, having a friction disk 73, is also provided and is disposed opposite the motor 70 so that the disks 71 and 73 are opposing each other with their axes offset, as best shown in FIG. 1. An idler 74 is positioned between the disks to drive the counter 72. As shown in FIG. 3, the idler 74 is mounted on a frame 75 which is slidably mounted on the posts 76. Idler 74 may therefore move in the direction of its axis along the faces of the disks 71 and 73 and is biased by spring 77 toward the axis of the revolution counter 72. As the idler 74 is moved away from the axis of disk 71 toward an outer edge, its angular velocity is increased due to the higher tangential velocity of the driving disk 71 nearer an outside edge. Disk 73 is also driven at a higher angular velocity as the idler approaches its axis since the idler need turn fewer times to cause one revolution of the disk 73 at an area near the axis of disk 73 than at one near the periphery. Therefore the rotation of the counter 72 increases exponentially as the idler is moved along the faces of disks 72 and 73 away from the axis of disk 71 toward the axis of disk 73.

The flow of fluid through the valve also increases exponentially as the gland 30 is moved from a closed position. The integrator means may be adapted to produce one revolution of the counter disk 73 for each liter of fluid that passes through the valve, the integrator or totalizer means therefore giving the sum of liters that flow through the valve.

The flow of fluid through the valve is a function of the setting of the gland 30. The relationship between the distance the gland moves from closed position and the liters of fluid flowing per unit of time may be graphically represented. The resultant performance curve produced shows that the liters per unit of time increases exponentially as the gland movement is increased. The totalizer may be adapted to produce an identical performance curve for the relationship of the revolutions per unit time of the counter disk 73 to the distance the idler 74 is moved from a zero setting, corresponding to the closed valve setting of gland 30, along the faces of disks 70 and 73. Therefore, a movement of gland 30 through a given distance will produce a given liter per unit time flow rate value on its performance curve. If the idler 74 is moved through a similar distance, it will produce a revolution per unit time for the counter 72 on its performance curve identical to the liters per unit time of the fluid flow. Each revolution of disk 73 therefore corresponds to the passage of one liter of fluid through the valve and the total volume of fluid is indicated by the counter 72, which adds all the revolutions, if movement of idler 74 is properly correlated to movement of gland 30.

Means are provided to interassociate the idler 74 and the gland 30 so that as gland 30 is moved through a given distance in the direction of its axis, idler 74 is moved a similar distance in the direction of its axis. Such means comprise a cam arm 80, disposed below plate 61 and pivoted thereto, to move under the urging of part 39 of gland 30 as the gland is positioned by turning knob 33. Linkage means, including the links 81 and 82, connect the end 83 of cam arm 80 to the idler frame 75. The cam arm 80 is provided with cam surface 84 to translate movement of gland 80 along its axis into motion of idler 74 in the direction of its axis, the two axes being at generally right angles to each other, while maintaining the extent of movement of the idler 74 identical to that of the gland 30.

It may therefore be seen that a fluid flow and metering device according to our invention may be provided in a relatively compact, portable assembly adapted to be susceptible of use in a variety of locations where fluid flow control and metering is desired. Our device is particularly suitable for use in accurately controlling the rate of flow of fluids such as oxygen for use in medical treatment of hospital patients and the like. The rate of flow established is very accurately maintained even under conditions of varying back pressure, is clearly indicated on scale means and the volume of fluid consumed is accurately indicated. There the cost of the fluid consumed is to be borne by individual users, and the supply is drawn from a central source supplying many users, such individual summation of consumption is clearly desirable. It should be noted, however that our fluid flow control and metering device may be employed in controlling various fluids, both liquid and gaseous in addition to controlling oxygen for hospital use.

The embodiment described in detail herein is exemplary only and the fluid flow control and metering device, according to our invention, may be provided in various embodiments, modifications and alterations thereof, in addition to the exemplary embodiment shown herein, the scope of our invention being defined by the following claims.

We claim:

1. A fluid flow control valve adapted to accurately regulate the flow of a fluid from a fluid supply line under high pressure into a fluid dispensing line of varying pressure wherein the valve may be adjusted to provide a predetermined rate of fluid flow and maintain said flow rate under conditions of varying back pressure in said fluid dispensing line, comprising: an axially movable metering gland having a generally hollow interior portion, said portion being open at one end to the fluid supply line and vented at a part thereof other than said open end to said fluid dispensing line; an axially movable plug adapted to enter said gland portion at the end open to said fluid supply line, said plug and gland forming a fluid passageway therebetween of adjustable size for metering fluid flow from said fluid supply line to said fluid dispensing line; means for adjusting the axial positioning of said gland relative to said plug to provide a predetermined rate of fluid flow through said fluid passageway; and means associated with said plug responsive to back pressure in said fluid dispensing line for automatically adjusting the axial positioning of said plug relative to said gland to maintain a predetermined rate of flow under conditions of changing back pressure in said fluid dispensing line.

2. A fluid flow control valve as in claim 1 wherein: said gland is provided with a rounded metering surface at said open end; said plug is a cylindrical pin having an inclined, flat surface and said fluid passageway between said pin and said metering surface is of variable semi-circular configuration.

3. A fluid flow control valve as in claim 2 wherein: said cylindrical pin is provided with a circular stabilizing ring near a forward end within said gland.

4. A fluid control valve as in claim 1 including flow rate indicator means associated with said gland adapted to indicate rate of fluid flow through said fluid passageway for a setting of said gland.

5. A device as in claim 4 wherein said flow rate indicator means comprises: a pivotally mounted arm adapted to be moved in an arcuate path under urging of a part of said gland; a scale calibrated in units of rate of fluid flow having a movable indicator thereon; and linkage means to translate arcuate movement of said arm to said indicator to show the expected rate of fluid flow for a setting of said gland on said scale.

6. A fluid flow control valve as in claim 1 including fluid flow integrator means associated with said gland adapted to totalize the volume of fluid flow through said gland, said integrator being responsive to movement of said gland in totalizing said flow.

7. A device as in claim 6 wherein said flow integrator means comprises: a constant speed motor having a friction disk operably associated therewith driven by said motor; a revolution counter having a friction disk operably associated therewith to drive said revolution counter, said friction disks opposing each other with their axes offset to each other; an idler disk operably disposed between said disks axially perpendicular to and between said friction disk axes, said idler being driven by said motor driven friction disk and driving said revolution counter friction disk; and means interassociated with said gland and said idler for moving said idler relative to said offset axes to vary the rate of revolution of said revolution counter friction disk relative to the setting of said gland.

8. A device as in claim 7 wherein said means interassociated with said gland and said idler comprises: a cam arm adapted to move under urging of a part of said gland in a predetermined manner due to the configuration of said cam and the axial movement of said gland; and linkage means to transfer motion of said cam arm to said idler.

9. A device as in claim 1 including means to restrict rearward axial movement of said plug under conditions of increased back pressure in said dispensing line to within a predetermined range, said means being adjustable for various expected conditions of back pressure.

10. A device as in claim 9 wherein said means to restrict rearward movement of said plug comprises: a cam plate adapted to abut against a part of said gland, and linkage means associated with said cam and a rear portion of said plug whereby said plug is restricted in its rearward movement by the abutment of said cam against said gland for various positions of said gland and said gland is constrained within a predetermined range of movement by said cam when said plug reaches a maximum adjustment in response to increased back pressure.

11. A fluid flow control apparatus comprising: a chambered housing having a fluid supply chamber and a fluid dispensing chamber, said chambers being separated by a ported partition; a metering gland; means for slidably mounting said gland within said housing for axial movement relative to said chambers through said ported partition; said gland having a hollow portion open at one end, said open end being disposed within said fluid supply chamber and having a rounded metering surface therein, said hollow portion being vented near an end opposite said open end thereof into said fluid dispensing chamber; a cylindrical pin disposed in said fluid supply chamber and means for producing axial movement thereof responsive to variation of pressure in said fluid dispensing chamber and for selectively interengaging said hollow portion of said gland; said pin having an inclined, flat surface providing an adjustable semicircular fluid passageway between said pin and said rounded metering surface of said gland.

12. In a flow control valve the provision of: a fluid-supply chamber and a fluid-dispensing chamber; a partition between said chambers; a manually adjustable valve in said partition for establishing a desired predetermined rate of fluid flow from the supply to the dispensing chamber, said valve including a tubular gland and a cylindrical plug extending thereinto; means responsive to pressure variations in the dispensing chamber to axially move said plug with respect to said gland to maintain rate of fluid flow through said valve substantially constant for any given setting of said gland; and means operated by manual adjustment of the valve gland for varying a range of limited movement of said plug.

13. A valve as in claim 12 wherein said plug is normally biased toward valve-closing position by spring means, said spring means being adapted to be overcome by fluid back pressures in the dispensing chamber of an order in excess of normal operating back pressure.

14. The device of claim 13 with the provision of flow rate indicator means associated with said gland adapted to indicate said rate of fluid flow and fluid flow integrator means associated with said gland adapted to indicate the volume of fluid flow through said valve.

15. A fluid flow control apparatus comprising: a chambered housing having a fluid supply chamber and a fluid dispensing chamber; an axially movable metering gland; means for slidably mounting said gland within said housing for selectively adjustable axial movement therein, said gland having a partition integral therewith separating said chambers and an internal hollow portion, said hollow portion being open at one end on a side of said partition within said fluid supply chamber and vented on an opposite side of said partition within said fluid dispensing chamber; a cylindrical pin disposed in said fluid supply chamber means for producing axial movement therein in response to variation of pressure in said fluid dispensing chamber and for interengaging said hollow portion of said gland to form an adjustable fluid flow passageway between said gland and pin for metering flow of fluid between said fluid supply chamber and said fluid dispensing chamber.

16. A fluid flow control apparatus comprising: a chambered housing having a fluid supply chamber and a fluid dispensing chamber, said chambers being separated by a ported partition; an axially movable metering gland slidably mounted within said housing including means for producing selected axial movement thereof relative to said chambers through said ported partition; said gland having a hollow portion open at one end, said open end being disposed within said fluid supply chamber and having a rounded metering surface therein, said hollow portion being vented near an end opposite said open end within said fluid dispensing chamber; a cylindrical pin disposed in said fluid supply chamber adapted for axial movement therein and for interengaging said hollow portion of said gland, said pin having an inclined, flat surface providing an adjustable semicircular fluid passageway between said pin and said rounded metering surface of said gland; and means responsive to back pressure arising in said fluid dispensing chamber and associated with said pin for moving said pin away from said gland upon increase in said back pressure to widen said adjustable fluid passageway.

17. A device as in claim 16 including means associated with said pin to restrict rearward axial movement of said pin within a predetermined range under urging of said pressure, said restricting means being adjustable in response to variations in the setting of said gland.

18. A fluid flow control apparatus comprising: a chambered housing having a fluid supply chamber and a fluid dispensing chamber; a metering gland; means for slidably mouning said gland within said housing for axial movement therein, said gland having a partition integral therewith separating said chambers, an internal hollow portion open at one end on a side of said partition within said fluid supply chamber and a vent on an opposite side of said partition within said fluid dispensing chamber; a cylindrical pin disposed in said fluid supply chamber; and means for producing selected axial movement of said pin for interengaging said hollow portion of said gland to form an adjustable fluid flow passageway between said gland and pin for metering flow of fluid between said fluid supply chamber and said fluid dispensing chamber, said pin being provided with means responsive to change of back pressure in said fluid dispensing chamber whereby said pin is moved relative to said housing and gland to maintain constant fluid flow rate through said passageway.

19. A fluid flow control apparatus comprising: a chambered housing having a fluid supply chamber and a fluid dispensing chamber, said chambers being separated by a ported partition; a metering gland; means for slidably mounting said gland within said housing for selected axial movement relative to said chambers; said gland having a hollow portion open at one end, said ported partition being disposed on said gland about said open end, said open end opening into said fluid supply chamber through said partition and having a rounded metering surface therein, said hollow portion being vented near an end thereof opposite said open end into said fluid dispensing chamber; a cylindrical pin disposed in said fluid supply chamber including means for producing axial movement thereof and for selectively interengaging said hollow portion of said gland; and means responsive to back pressure arising in said fluid dispensing chamber and associated with said pin for moving said pin away from said gland upon increase in said back pressure.

20. In a flow control valve the provision of: a fluid-supply chamber and a fluid-dispensing chamber; a movable ported partition between said chambers; an adjustable valve associated with said ported partition for establishing a desired predetermined rate of fluid flow from the supply chamber to the dispensing chamber, said valve including a tubular gland integrally formed with said ported partition, said gland opening through said ported partition into said fluid supply chamber and being vented into said fluid-dispensing chamber, and a plug extending into the opening in said gland through said ported partition; means for producing selected axial adjustment of said gland and partition; and means responsive to pressure variations in the fluid-dispensing chamber to axially move said plug with respect to said gland to maintain a desired rate of fluid flow through said valve substantially constant for any given axial adjustment of said gland.

21. A device as in claim 20 including means operated by adjustment of the valve gland for varying a range of limited movement of said plug.

22. The device of claim 20 wherein said means responsive to pressure variations in the fluid-dispensing chamber comprises: a chambered housing surrounding a rearward portion of said plug extending outwardly from said fluid supply chamber; an annular piston element disposed on said plug within said chambered housing dividing said housing into a forward and rearward chamber; spring means within said rearward chamber biasing said plug forwardly of said housing toward said gland; and a fluid conduit communicating between said fluid-dispensing chamber and said forward chamber of said housing whereby fluid pressure substantially equal to that within said fluid-dispensing chamber is communicated to a forward side of said annular piston element on said plug, said plug moving under the resultant influence of said fluid pressure and said spring means.

23. In a fluid flow control apparatus having a fluid supply inlet and a fluid dispensing outlet interconnected by a fluid metering valve, said valve including an axially movable tapered valve pin adapted to meter fluid flow through an orifice in said valve by axial movement of said pin relative to the axis of said orifice, the provision of: means responsive to change in fluid pressure in said fluid dispensing outlet associated with said movable valve pin whereby said tapered pin is moved relative to said valve orifice to maintain constant fluid flow rate through said orifice from said inlet to said outlet under conditions of changing fluid pressure in said outlet, said means being independent of any change in fluid pressure in said fluid-supply chamber.

24. A fluid flow control apparatus comprising: a chambered housing having a fluid supply chamber and a fluid dispensing chamber; an axially movable metering gland slidably mounted in said housing including means for producing selected manual settings thereof, said gland having a partition integral therewith separating said chambers and an internal hollow portion extending longitudinally of said gland and substantially enclosed within said gland, said hollow portion being vented through a side wall of said gland to said fluid dispensing chamber and open at an end of said gland through said partition to said fluid supply chamber; a valve pin disposed in said fluid supply chamber; means for producing axial movement of said pin in said fluid supply chamber in response to variation of pressure in said fluid dispensing chamber and for interengaging said hollow portion of said gland through said end of said gland open to said fluid supply chamber to form an adjustable fluid flow passageway between said gland and said valve pin for metering flow of fluid between said fluid supply chamber and said fluid dispensing chamber.

25. A fluid flow metering and flow control apparatus for maintaining a constant predetermined rate of fluid flow comprising: a fluid supply chamber; a fluid dispensing chamber; a fluid flow metering valve interconnecting said chambers, said valve including an axially movable gland having an open end within said fluid supply chamber and being vented remote from said open end to said fluid dispensing chamber and a valve pin disposed in said fluid supply chamber means for mounting said pin to interengage said gland through said open end to provide an adjustable metering valve opening between said gland and pin, said pin being responsive to variation in pressure in said fluid dispensing chamber; means for producing selected axial settings of said gland; and means associated with said pin to restrict rearward movement of said pin under urging of increase in pressure in said fluid dispensing chamber, said restricting means being adjustable in response to the settings of said gland.

26. A device as in claim 24 including means associated with said pin to restrict rearward movement of said pin within a predetermined range under urging of fluid pressure in said outlet, said restricting means being adjustable in response to variations in the manual setting of said gland.

27. The device of claim 24 including means to restrict rearward movement of said valve pin under conditions of increased pressure in said fluid dispensing chamber to a predetermined extent for each setting of said gland, said means comprising: a cam plate pivotally mounted on the housing to present a cam surface toward a portion of said gland; and linkage means interconnecting said cam plate with said valve pin, rearward movement of said pin causing said cam surface to abut said portion whereby, for any given setting of said gland, said valve pin is restricted to rearward movement of a predetermined extent determined by the shape of said cam surface, said cam surface being selectively provided for operation under expected conditions of fluid pressure in said fluid dispensing chamber.

References Cited in the file of this patent

UNITED STATES PATENTS

| | | |
|---|---|---|
| 501,959 | Rawlings | July 25, 1893 |
| 1,199,152 | Bruce | Sept. 26, 1916 |
| 1,766,554 | Sieber | June 24, 1930 |
| 2,938,756 | Loeb | May 31, 1960 |

FOREIGN PATENTS

| | | |
|---|---|---|
| 281,155 | Great Britain | Dec. 1, 1927 |